(12) United States Patent
Gerovac et al.

(10) Patent No.: US 7,779,175 B2
(45) Date of Patent: Aug. 17, 2010

(54) SYSTEM AND METHOD FOR RENDEZVOUS IN A COMMUNICATIONS NETWORK

(75) Inventors: Branko J. Gerovac, Lexington, MA (US); David C. Carver, Lexington, MA (US)

(73) Assignee: Blackwave, Inc., Acton, MA (US)

( * ) Notice: Subject to any disclaimer, the term of this patent is extended or adjusted under 35 U.S.C. 154(b) by 618 days.

(21) Appl. No.: 11/744,394

(22) Filed: May 4, 2007

(65) Prior Publication Data

US 2008/0273540 A1      Nov. 6, 2008

(51) Int. Cl.
*G06F 3/00* (2006.01)
*G06F 5/00* (2006.01)

(52) U.S. Cl. .................. 710/36; 370/255; 370/389; 370/428

(58) Field of Classification Search .............. 710/36; 370/389, 396
See application file for complete search history.

(56) References Cited

U.S. PATENT DOCUMENTS

| | | | |
|---|---|---|---|
| 3,746,780 A | | 7/1973 | Stetten et al. |
| 3,851,104 A | | 11/1974 | Willard et al. |
| 4,845,658 A | | 7/1989 | Gifford |
| 5,132,992 A | | 7/1992 | Yurt et al. |
| 5,581,552 A | * | 12/1996 | Civanlar et al. ............ 370/396 |
| 5,581,784 A | | 12/1996 | Tobagi et al. |
| 5,583,995 A | | 12/1996 | Gardner et al. |
| 5,608,448 A | | 3/1997 | Smoral et al. |

(Continued)

FOREIGN PATENT DOCUMENTS

WO    WO 2008/137334    11/2008

(Continued)

OTHER PUBLICATIONS

International Search Report and Written Opinion for International Application No. PCT/US2008/061401, dated Jul. 1, 2008, 8 pages.
PCT Invitation to Pay Additional Fees dated Oct. 26, 2009 for PCT Pat. No. PCT/US2009/050057 filed on Jul. 9, 2009.

(Continued)

*Primary Examiner*—Henry W. H. Tsai
*Assistant Examiner*—Elias Mamo
(74) *Attorney, Agent, or Firm*—Daly, Crowley, Mofford & Durkee, LLP

(57) ABSTRACT

The present invention introduces the notions of a rendezvous component and rendezvous functionality into the communications network environment. Using the invention, an application can express information regarding when an operation requested of a device should complete and at which location, and it enables the device to perform its operations respecting this information while also improving the device's overall behavior. In an embodiment, one or more data objects are distributed across one or more collections of storage devices using a dispersal technique. When access to a data object is desired, a rendezvous component issues a set of constituent requests to the collections of storage devices. These requests typically include location and timing rendezvous parameters specifying a destination location where and a given time when a given data object is to be reconstituted. The data object is then reconstituted at the destination location and at the given time, while respecting a given characteristic of a storage device access model. In this embodiment, the collection of storage devices may comprise disk devices, and the requests are issued by a given application, such as a media server.

16 Claims, 2 Drawing Sheets

U.S. PATENT DOCUMENTS

| | | | |
|---|---|---|---|
| 5,640,563 | A | 6/1997 | Carmon |
| 5,708,796 | A | 1/1998 | Ozden et al. |
| 5,761,692 | A | 6/1998 | Ozden et al. |
| 5,787,482 | A | 7/1998 | Chen et al. |
| 5,805,804 | A | 9/1998 | Laursen et al. |
| 5,862,312 | A | 1/1999 | Mann et al. |
| 5,926,649 | A * | 7/1999 | Ma et al. ........................ 710/6 |
| 6,230,200 | B1 | 5/2001 | Forecast et al. |
| 6,374,336 | B1 | 4/2002 | Peters et al. |
| 6,378,036 | B2 | 4/2002 | Lerman et al. |
| 6,401,126 | B1 * | 6/2002 | Douceur et al. ............. 709/231 |
| 6,609,149 | B1 | 8/2003 | Bandera et al. |
| 6,691,208 | B2 | 2/2004 | Dandrea et al. |
| 7,058,947 | B1 | 6/2006 | Raja et al. |
| 7,277,978 | B2 * | 10/2007 | Khatami et al. ............. 711/103 |
| 2003/0005457 | A1 | 1/2003 | Faibish et al. |
| 2003/0140051 | A1 | 7/2003 | Fujiwara et al. |
| 2003/0195948 | A1 | 10/2003 | Takao et al. |
| 2004/0103437 | A1 | 5/2004 | Allegrezza et al. |
| 2004/0128459 | A1 | 7/2004 | Chanda et al. |
| 2004/0198386 | A1 | 10/2004 | Dupray |
| 2005/0044289 | A1 | 2/2005 | Hendel et al. |
| 2005/0181803 | A1 * | 8/2005 | Weaver et al. ............ 455/456.1 |
| 2005/0262246 | A1 | 11/2005 | Menon et al. |
| 2005/0283818 | A1 | 12/2005 | Zimmermann et al. |
| 2006/0062555 | A1 | 3/2006 | Zimmermann et al. |
| 2006/0087990 | A1 * | 4/2006 | Kakivaya et al. ............ 370/299 |
| 2006/0190552 | A1 | 8/2006 | Henze et al. |
| 2006/0259662 | A1 * | 11/2006 | Furukawa et al. ............. 710/40 |
| 2006/0272015 | A1 | 11/2006 | Frank et al. |
| 2008/0109580 | A1 | 5/2008 | Carlson et al. |
| 2008/0244033 | A1 | 10/2008 | Hook et al. |
| 2010/0010999 | A1 | 1/2010 | Gerovac et al. |
| 2010/0011002 | A1 | 1/2010 | Gerovac et al. |
| 2010/0011003 | A1 | 1/2010 | Carver et al. |
| 2010/0011091 | A1 | 1/2010 | Carver et al. |
| 2010/0011096 | A1 | 1/2010 | Gerovac et al. |
| 2010/0011145 | A1 | 1/2010 | Carver et al. |
| 2010/0011364 | A1 | 1/2010 | Gerovac et al. |
| 2010/0011365 | A1 | 1/2010 | Gerovac et al. |

FOREIGN PATENT DOCUMENTS

| | | |
|---|---|---|
| WO | WO 2010/006127 | 1/2010 |
| WO | WO 2010/006132 | 1/2010 |
| WO | WO 2010/006134 | 1/2010 |

OTHER PUBLICATIONS

PCT Search Report of the ISA for PCT/US2009/050057 dated Jan. 14, 2010.
Written Opinion of the ISA for PCT/US2009/050057 dated Jan. 14, 2010.
Amazon S3; Developer Guide (API Version Mar. 1, 2006); Amazon Web Services; http://www.amazon.com/gp/browse.html?node=16427261; Mar. 1, 2006.
Androutsellis-Theotokis et al; "A Survey of Peer-to-Peer Content Distribution Technologies;" AMC Computing Surveys, vol. 36, No. 4; Dec. 2004; pp. 335-371.
Braam; File Systems for Clusters from a Protocol Perspective; 2nd Extreme Linux Topics Workshop; Jun. 1999; 5 sheets.
Chen et al.; "RAID: High-Performance, Reliable Secondary Storage;" AMC Computing Surveys, vol. 26, No. 2; DOI=http://doi.acm.org/10.1145/176979.176981; Jun. 1994; pp. 145-185.
Gal: "Algorighms and Data Structures for Flash Memories;" ACM Computing Surveys, vol. 37, No. 2; DOI=http://doi.acm.org/10.1145/1089733.1089735; Jun. 2005; pp. 138-163.
Ghandeharizadeh et al; "Continuous Display of Video Objects Using Multi-Zone Disks;" USC-CSE-94592; Apr. 12, 1995; 28 sheets.
Goel et al.; SCADDER: An Efficient Randomized Technique to Reorganize Continuous Media Blocks; 18th Int'l Conf on Data Engineering (ICDE 2002); Feb. 26-Mar. 1, 2002; 10 sheets.
Griwodz et al.; Long-term Movie Popularity Models in Video-on-Demand Systems or The Life on an on-Demand Movie; 5th ACM Int'l Conf. on Multimedia; DOI=http://doi/acm/org/10.1145/266180-266386; Nov. 9-13, 1997; pp. 349-357.
Hartman et al.; "The Zebra Striped Network File System;" ACM Trans. Comput. System, vol. 13, No. 3; DOI=http://doi.acm.org/10.1145/210126.210131; Aug. 3, 1995; pp. 274-310.
Liskov et al.; "Providing Persistent Objects in Distributed Systems;" 13th European Conference on Object-Oriented Programming; Ed. Lecture Notes in Computer Science, vol. 1628; Jun. 14-18, 1999; pp. 230-257.
Liskov et al.; "Transactional File System Can Be Fast;" 11th Workshop an ACM SIGOPS European Workshop: Beyond the PC; DOI=http://doi.acm.org.10.1145/1133272.1133592; Sep. 19-22, 2004; pp. 1-6.
Little et al.; "Popularity-Based Assignment of Movies to Storage Devices in a Video-on-Demand System;" Multimedia Systems, vol. 2, No. 6; Jan. 1995; pp. 280-287.
Liu et al.; "Scheduling Algorithms for Multiprogramming in a Hard-Read-Time Environment;" Journal of the Association for Computing Machinery, vol. 20, No. 1; DOI=http://doi.acm.org/10.1145/321738.321743; Jan. 1973; pp. 46-61.
Long et al; "Swift/RAID: A Distributed Raid System;" Comput. Syst. 7, 3; Jun. 1994; pp. 333-359.
"NAND Flash Memories and Programming NAND Flash Memories Using ELNEC Device Programmers Application Note Version 2.01;" Sep. 2006, pp. 1-31.
Oney; "Queueing Analysis of the Scan Policy for Moving-Head Disks;" Journal of the Association for Computing Machinery, vol. 22, No. 3; DPI=doi.acm.org/10.1145/321892.987902; Jul. 1975; pp. 397-412.
Patterson et al.; "A case for Redundant Arrays of Inexpensive Disks (RAID); 1988 AC SIGMOD Int'l Conference on Management of Data;" DOI=http;//doi.acm.org.10.1145/50202.50214; Jun. 1-3, 1988; pp. 109-116.
Pinheiro et al; "Failure Trends in a Large Disk Drive Population;" FAST '07: 5th USENIX Conference on File and Storage Techniques; Feb. 13-16, 2007; pp. 17-28.
Reddy et al.; "I/O Issues in a Multimedia System;" DOI=ex.doi.org. 10.1109/2.268888; Mar. 1994; pp. 69-74.
Ruemmler et al.; "An Introduction to Disk Drive Modeling;" DOI=http://dx.doi.org/10.1109/2.268881; Mar. 1994; pp. 17-28.
Samsung Memory Division; NAND Flash ECC Algorithm 256B; Jun. 24, 2004; 8 sheets.
Samsung Memory Division; ECC Algorithm; 512B; Apr. 28, 2005; 8 sheets.
Samsung Memory Division; NAND Flash Spare Area Assignment Standard; Apr. 27, 2005; 5 sheets.
Schindler et al; "Automated Disk Drive Characterization;" Technical Report CMU-CS-99-176; Carnegie Mellon University; Dec. 1999; 21 sheets.
Schroeder et al.; "Disk Failures in the Real World; What Does an MTTF of 1,000,000 Hours Mean to You?;" FAST '05: 5th USENIX Conference on File and Storage Technologies; FAST '07; 2007; Feb. 14, 2007; pp. 1-16.
Sha et al.; "A Systematic Approach to Designing Distributed Real-Time Systems;" Computer vol. 26, No. 9; DOI=http://dx.doi.org/10.1109/2.231276; Sep. 1993; pp. 67-78.
Shahabi et al; "Yima: A Second-Generation Continuous Media Server;" IEEE Computer Magazine, Jun. 2002; pp. 56-64.
Shenoy; "Cello: A Disk Scheduling Framework for Next Generation Operating Systems;" Real-Time Syst. 22; 1-2; Jan. 2002; pp. 1-22.
Sinha et al.; "Intelligent Architectures for Managing Content;" Communications Technology Magazine; May 1, 2003; pp. 1-3.
Stoller et al; "Storage Replication and Layout in Vidio-on-Demand Servers;" 5th Int'l Workshop on Network and Operating System Support for Digital Audio and Video; Apr. 19-21, 1995; Eds. Lecture Notes in Computer Science, vol. 1018; pp. 330-341.
Stonebraker et al.; "Distributed RAID-A New Multiple Copy Algorithm;" 6th Int'l Conference on Data Engineering; IEEE Computer Society; Feb. 5-9, 1990; pp. 430-437.

Talagala et al; "2000 Microbenchmark-based Extraction of Local and Global Disk Characteristics;" UMI Order No. CSD-99-1063; University of California at Berkley; pp. 26.

Teorey et al.; "A Comparative Analysis of Disk Scheduling Policies;" Communications of the ACM, vol. 15, No. 3; DOI=doi.acm.org/10.1145/361268/361278; Mar. 1972; pp. 177-184.

Tetzlaff; "Elements of Scalable Video Servers;" 40th IEEE Computer Society Int'l Converence; COMPCON; Mar. 5-9, 1995; pp. 239-248.

Thouin et al.; "Video-on-Demand Networks; Design Approaches and Future Challenges;" IEEE Network-Special Issue on Convergence of Internet and Broadcasting Systems, vol. 22, No. 2; Mar. 2007; pp. 42-48.

Tsun-Ping et al.; "Strategic S3lection and Replication of Movies by Trend-Calibrated Movie-Demand Model;" 2000 Int'l Conference on Microelectronic Systems Education; MSE; Nov. 13, 2000; pp. 97-100.

Venugopal et al.; "A Taxonomy of Data Grids for Distributed Data Sharing, Management, and Processing;" AMC Computing Surveys, vol. 38, Mar. 2006; Article 3, pp. 1-53.

Worthington et al.; "Scheduling for Modern Disk Drives and Non-Random Workloads;" University of Michigan, Technical Report CSE-TR-194-94, Mar. 1, 1994; pp. 51 sheets.

Worthington et al; "On-Line Extraction of SCSI Disk Drive Parameters;" University of Michigan; Technical Report CSE-TR-323-96; Dec. 19, 1996; 46 sheets.

Zimmerman; "Continuous Media Placement and Scheduling in Heterogeneous Disk Storage Systems;" Technical Report, USC-99-699; pp. 1-100, 1999.

Mourad; "Issues in the design of a storage server for video-on-demand;" Multimedia Systems; vol. 4, No. 2; Apr. 1, 1996; XP008040912; pp. 70-86.

PCT Search Report of the ISA for PCT/US2008/061401 dated Jul. 1, 2008.

PCT Search Report and Written Opinion of the ISA for PCT/US2009/050051 dated Sep. 7, 2009.

Office Action dated May 7, 2010 for U.S. Appl. No. 12/170,769.

Restriction Requirement dated Jun. 10, 2010 from U.S. Appl. No. 12/170,624.

* cited by examiner

SYSTEM AND METHOD FOR RENDEZVOUS IN A COMMUNICATIONS NETWORK

BACKGROUND OF THE INVENTION

1. Technical Field

The present invention relates generally to optimizing and harmonizing the use of shared devices by applications in a communications network. Optimization includes performance and scalability; harmonization includes enabling heretofore disparate applications to coexist and share network resources.

2. Background of the Related Art

The term "rendezvous" is well-established in the computing literature in the context of programming language support for concurrent computing and real-time operating systems. In particular, computer languages, such as Ada and Distributed Logic Programming (DLP), use the concept of "rendezvous" to refer, respectively, to the process of synchronizing concurrent tasks and objects. Real-time operating systems commonly provide interfaces allowing applications to express deadlines, thereby facilitating deadline scheduling (which is a form of rendezvous scheduling). These uses of the term "rendezvous" are oriented toward managing or scheduling the use of processing resources in closed systems.

The term "rendezvous" is also used in literature relating to communications networks. In particular, so-called rendezvous protocols have been defined, but typically in the context of some human or network organizational task. For example, rendezvous scheduling is used to manage meeting rooms, A/V equipment, video conference resources, and other resources for in-person and/or on-line meetings. Or, for example, on-line dating services may arrange for a rendezvous between its clientele. Computer and network applications and/or systems of communications may be employed, but the rendezvous is between humans.

In network environments, "rendezvous" may be used by nodes or services of a cluster in establishing a quorum. "Rendezvous" also is used in network routing to mean a place, a rendezvous point, through which network traffic flows. Further, "rendezvous" is also used in the mobile network context, such as with Bluetooth and other wireless network technologies, to mean a place where access through surrounding networks is established. These uses are principally concerned with network organization, namely, management, configuration, authorization, connection and session establishment, and the like.

Thus, while literature in computing theory and practice describes many potential benefits associated with rendezvous techniques (rendezvous or deadline scheduling, rendezvous synchronization, and the like), such techniques have been limited. Devices in a network may or may not use rendezvous functionality internally—embedded operating systems often include rendezvous interfaces—but rendezvous functionality, even if it exists, is rarely exposed to applications across a communications network and no general method is known to exist. At best, some protocols provide a means for setting priority. Although priority is a useful attribute, it alone severely limits the ability to optimize the use of shared resources in a communications network, especially when heterogeneous usage patterns are involved.

Matters concerning performance in a communications network are generally addressed from a Quality of Service (QoS) perspective. QoS mechanisms operate on the service (e.g., Differentiated Services) or session (e.g., Resource Reservation Protocol) level, and are not typically applied to or invoked with individual messages. Indeed, doing so would be at variance with the design intent of such mechanisms.

BRIEF SUMMARY OF THE INVENTION

It is a general object of the invention to create a new notion of rendezvous with respect to shared resources across communications networks.

The present invention introduces the notions of a rendezvous component and rendezvous functionality into the communications network environment. Using the invention, an application can express information regarding when an operation requested of a device should complete and at which location, and it enables the device to perform its operations respecting this information while also improving the device's overall behavior. In one embodiment, one or more data objects are distributed across one or more collections of storage devices using a dispersal technique. When access to a data object is desired, a rendezvous component issues a set of constituent requests to the collections of storage devices. These requests typically include location and timing rendezvous parameters specifying a destination location where and a given time when a given data object is to be reconstituted. The data object is then reconstituted at the destination location and at the given time, while respecting a given operating or performance characteristic of a storage device. In this embodiment, the collection of storage devices may comprise disk devices and the requests are issued by a given application, such as a media server.

In another embodiment, a method is operative in a distributed system comprising a set of storage devices. The method begins upon receipt of a rendezvous access request that comprises a set of zero or more action parameters, a set of zero or more event parameters, and a set of zero or more location parameters. For a given access operation, an action parameter describes an access to be performed, an associated event parameter specifies a time with respect to which the access is to be performed, and the location parameter describes a source or destination object associated with the access. In response to receipt of a rendezvous access request, the request is transformed into a set of one or more device-specific requests. The one or more device-specific requests are then provided to a subset of the storage devices in the set of storage devices such that the given access operation is performed in a manner that satisfies the action parameters, event parameter and the location parameters.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
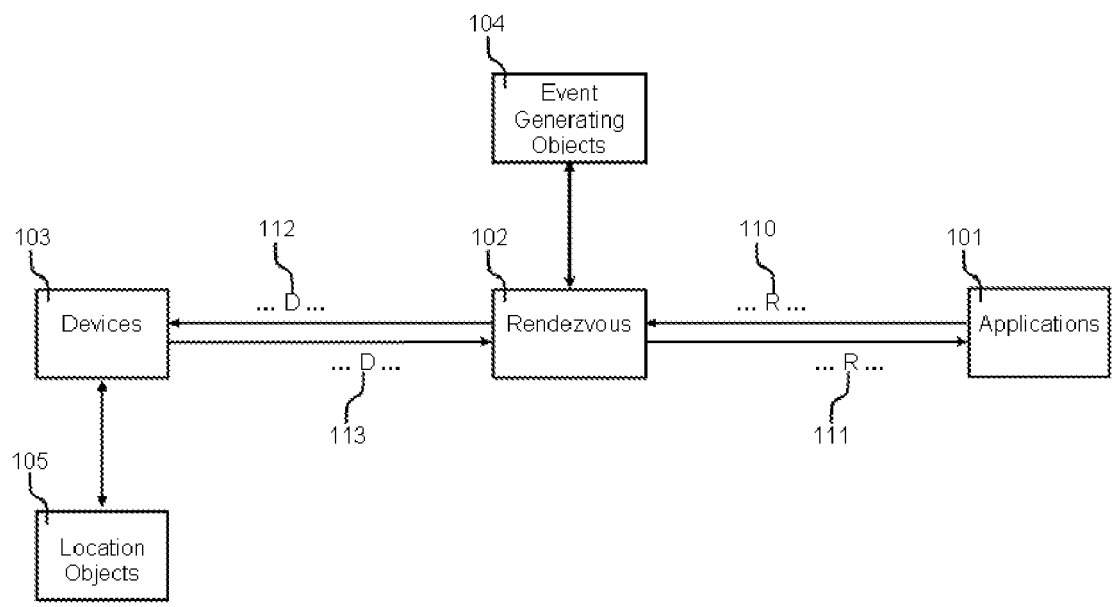
FIG. 1 shows the general case of rendezvous in a communications network, including a rendezvous component, its relationship to devices and applications in a system, and the flow of messages involved with setting up and performing a rendezvous.

Rendezvous in a Communications Network Referring to FIG. 1, one or more rendezvous components 102 extend one or more devices 103 with rendezvous functionality, and provide an interface to this functionality to one or more applications 101. Rendezvous interface functionality refers to any setup, monitoring, and management of rendezvous and rendezvous components 102. Thus, some components of the system use the rendezvous interface to obtain rendezvous functionality whereas other components of the system use the rendezvous interface to manage the operation, health, and performance of one or more rendezvous components and/or of other components in the system. A device 103 also may be rendezvous aware, meaning the device supports rendezvous functionality and provides an interface to that functionality (e.g., the equivalent of a rendezvous component has been integrated into the device). It is envisioned that over time more and more devices will become rendezvous aware.

Although FIG. 1 shows rendezvous components 102 used with applications 101 and devices 103 suggesting a client/server context, it is envisioned that rendezvous components 102 will also be used with objects that communicate as peers (i.e., in a peer-to-peer context). For example, it is envisioned that grid or peer-to-peer computing systems will benefit from rendezvous. More generally, the distinction between applications and devices is meant to be instructional, not constraining. Though storage, communications, and computational objects are of particular interest, applications 101 and devices 103 may be, without restriction, any objects in the system where one object wants to request a service from another object; rendezvous can be used to augment the request and/or service. Though FIG. 1 shows a set of independent components, this also is intended to be instructional, not constraining. Implementations may, for example, employ one or more of the following constructs: Hybrid components: components with a relationship to some set of objects in the system and with one or more different relationships to one or more other sets of objects in the system. For example, a device in one part of a system could be an application to another part of the system; one or more rendezvous components communicating with sets of devices could in turn relate as devices to one or more other rendezvous components, etc. Integrated components: components that bind together two or more components, or the functionality of two or more components. Composite components: components that bind two or more components together such that they appear as components that have private communication links among them. Integrated or composite components that present rendezvous functionality are referred to as being rendezvous aware (e.g., rendezvous aware devices, rendezvous aware storages, rendezvous aware processing elements, rendezvous aware network elements, rendezvous aware protocols, etc.). Distributed components: components composed of multiple instances, whether geographically localized or disbursed. Multiple instances of a particular component (or collection of components) can use any of various distributed system techniques. For example, an implementation can use multiple rendezvous components in parallel (e.g., to divide load, to service particular subnets, to service particular application classes, to service particular device classes, etc.) and/or in succession (e.g., to provide different forms of rendezvous functionality, to aggregate requests, to disaggregate requests, etc.).

A rendezvous is a requested condition whereby a specified action is to be performed with respect to a specified event and/or with respect to (at) a specified location, e.g., a request for a response by a specified time, a request to send data to a specified object by a specified time, etc. A principal function of rendezvous components 102 is to schedule the performance of actions so as to meet the objectives of their respective rendezvous (this functionality is also called rendezvous scheduling in this system description). Performed with respect to an event refers to how an action is initiated or completed relative to an event, e.g., an action is to complete before an event occurs, an action is to complete after an event occurs, an action is to start after an event occurs, an action is to start before an event occurs, an action is to start within a probability distribution near an event, an action is to occur with some probability in response to an event, etc. Rendezvous can be applied to any style of scheduling semantics (including alternate event models and exception handling). Different implementations may benefit from different primitives, such as scheduled start semantics, or from a less primitive semantics, such as "complete by time or abort-and-continue without error", or "best-effort complete by time or complete late". Many other such semantics as described in the literature can be applied in this novel concept of rendezvous.

An event is generated by an event generating object 104 in the system, examples of which include periodic time events from a system or network clock, events generated by one or more devices, events generated by one or more applications, etc. Events can be explicitly ordered (e.g., time, enumeration) or otherwise sequenced (e.g., an object's state transitions) or can be non-sequenced (e.g., stochastic). It is expected that rendezvous components 102 will communicate with event generating objects 104 to exchange information about events. Examples include requests for and notifications of events, information exchanged in advance of events that enable rendezvous components to simulate or model events as a proxy to receiving event notification messages, etc. A location 105 is an object in the system where the effects of a specified action are made manifest. The location 105 may be, without restriction, any object in the system, including but not limited to the device 103 performing the action, other devices, applications, rendezvous components in the system, etc. How an effect of an action is made manifest depends on the requirements of the particular implementation and though FIG. 1 shows devices 103 communicating with locations 105, this communication is not strictly required (e.g., the means by which the effect of an action is made manifest could be external to the system).

Resulting rendezvous primitives can be used to create additional rendezvous functionality. For example, to initiate an action after a first event and finish it before a second event could be expressed with completion semantics primitives as two consecutive rendezvous statements 'complete wait before first event' followed by 'complete action before second event'. Thus, it is envisioned that implementations often will employ one or more suitable means of organizing rendezvous primitives. Examples include, but are not limited to, sequencing requests, nesting one request within another, grouping requests into tasks, issuing concurrent requests, defining conditional requests, issuing interdependent requests, defining compound requests, etc. This principle of creating more complex functionality though the use of such organizations is intended to apply to all functionality described in this system description thereby enabling more clear and concise description of primitive functionality without loss of generality or claims to invention of more complex functionality.

A rendezvous protocol is a set of rules governing access to rendezvous interface functionality through the transmission of messages to and from rendezvous components 102. Similarly, a device protocol is a set of rules governing access to device interface functionality through the transmission of messages to and from devices 103. Different implementations may employ different rendezvous and device protocols, and a given implementation may employ one or more rendezvous and device protocols. Rendezvous protocols and device protocols also may be integrated to produce rendezvous aware protocols. Further, a rendezvous protocol may encapsulate or otherwise augment one or more device protocols thereby allowing rendezvous functionality to be added to a system in a manner that is transparent to certain components and subsystems. This may be done, for example, in situations where devices 103 are not rendezvous aware, or where devices 103 are rendezvous aware, but the protocol(s) being used do not support rendezvous functionality. A rendezvous protocol may also operate out-of-band from a device protocol it is augmenting, for example, applications 101 may communicate separately to devices 103 and to rendezvous components 102 which in turn communicate with devices 103 to produce desired rendezvous behaviors.

Here and throughout this system description, communications between components of the system are described in terms of representative messages moving from one component to another for select pairs of components. This is intended to be instructive, not constraining. Depending on the implementation, components may communicate even if a line of communications is not shown in the figures. Zero or more messages are expected to be sent and/or received in accordance to the rules of one or more protocols as described above. Different messages between a pair of components need not travel the same communications path. The description of a single representative message between a pair of components is not intended to imply a requirement to use one-to-one communication: the use of one-to-one (e.g., unicast), one-to-many (e.g., multicast), and/or many-to-one (e.g., multi-homing) methods of communication may be advantageous depending on the situation and the requirements of the implementation.

R 110 represents a message sent by an application 101 to a rendezvous component 102. The message may contain a request for the rendezvous component to perform some function or may contain a description of some state or change of state in the application. Requests include, but are not limited to requests to setup and manage rendezvous (these requests are also called rendezvous requests in this system description). Rendezvous requests may include a set of action parameters, a set of event parameters, and a set of location parameters, though these sets may overlap (e.g., event and/or location information may be included in the set of action parameters) and one or more of these sets may be null. Action parameters describe an action to be performed. Event parameters describe an event with respect to which the action is to be performed. Location parameters describe a location with respect to which the action is to be performed. Rendezvous request parameters may also include contingency or failure response conditions. For example, with some types of rendezvous it may be important to abort execution and report an error to an application; with other types of rendezvous it may be important to proceed with execution; with yet other types of rendezvous it may be important to abort execution according to some timeout condition even though the rendezvous conditions have not been met.

R 111 represents a message transmitted by a rendezvous component 102 to an application 101. The message may contain a description of some state or change of state in the rendezvous component or may contain a request for the application to perform some function. A description may include the status of outstanding or completed requests, the status of one or more rendezvous, the state of one or more rendezvous components, the state of one or more other components in the system (for example, information pertaining to the operation, health, and performance of one or more devices). Further, it may be advantageous to include information concerning the conditions under which requested actions were completed. It may also be advantageous to transmit multiple messages in response to a request: one to acknowledge receipt of a request; one to notify the application about the progress and completion of a requested action, one to indicate when the associated rendezvous event occurs, etc. Such information may be used by applications to regulate admissions to the system. For example, if actions are consistently completed well in advance of their rendezvous requirements, applications may infer that it is safe to increase admissions. If, however, actions complete near to or exceeding their rendezvous requirement, applications may choose to deny future admissions or even to shed or to shift loads to protect the viability of the system as a whole.

D 112 represents a message transmitted by a rendezvous component 102 to a device 103. The message may contain a request for the device to perform some function (these requests are also called device requests in this system description) or contain a description of some state or change in state in the rendezvous component. A requested function may, among other things, relate to the target action of a rendezvous or to monitoring and managing the operation, health, and performance of one or more devices 103 or other components in the system. Typically, though this is not strictly required, a rendezvous component 102 will transmit one or more messages D 112 to a device 103 in response to receiving one or more messages R 110 from an application 101. A principal function of rendezvous components 102 is to use available information to transform one or more rendezvous requests into one or more device requests so as to optimize the use of resources and to thereby optimize some aspect of system performance and/or behavior. Examples of such transformations include, but are not limited to reordering, commingling, sequencing, merging, dividing, etc. requested actions into a set of device requests. Examples of available information include, but are not limited to, the current request parameters, information about other past and present requests, information about one or more devices, information about the state of one or more rendezvous components 102, information about applications, information about the communications network, information about other components in the system, etc.

D 113 represents a message transmitted by a device 103 to a rendezvous component 102. The message may contain a description of state or changes of state in the device or contain requests for the rendezvous component to perform some function. A description may include, for example, the status of outstanding or completed requests, the state of a device, the state of one or more other objects in the system, etc. For example, message D 113 may be sent to acknowledge receipt of message D 112, and subsequent messages may be sent to notify a rendezvous component 102 about the progress and completion of the requested function. A message may also include information pertaining to the operation, health, or performance of a device 103 or of other objects in the system. Note that a device 103 may transmit messages to other objects in the system without intervention of a rendezvous component 102. Further, in some implementations, some communications between applications 101 and devices 103 may involve rendezvous components 102, and some may not (e.g., applications 101 and devices 103 may communicate directly for some operations).

It is anticipated that rendezvous components 102 will collect information relating to the performance of rendezvous requests and device requests as compared to the goals of the requests and that this information could be queried through a management interface. Some implementations will benefit from having system components exchange management information; management components, not shown, may also exist that monitor and/or control various aspects of the system. For example, a device health monitor could be used to inform an application whether a particular device is operating normally, operating in some degraded mode, or not operating at all. Or, for example, data generated by a rendezvous component could be collected by a process that acts to balance loads and to relieve congestion in the system.

Some implementations will benefit from creating an abstract device model with individual device models for each type or class of device. For example, device models could include any access characteristics that determine access behavior and performance, e.g., (a) disk drive track, cylinder, and sector access relationships, (b) disk zones, (c) logical block, (d) memory bank, page, block access relationships, etc. Thereby, a single rendezvous scheduler (or collection of schedulers) can be used to access many different types of devices or to optimize different aspects of devices by using the appropriate device model. Device models may be very rich, and may describe many aspects of device behavior under various operating conditions, such as incorporating an aging model of the device's behavior. Device models may be static or dynamic. For example, a dynamic model might adapt based on past device behavior. A detailed device model can be developed for a device prior to incorporating it into a particular implementation, or a device model can be derived when a device is incorporated into a particular implementation through a discovery process that tests and probes device behavior with modeling workloads.

Rendezvous may be adaptive, and may determine scheduling based on changes occurring in the types of requests being made and in the manner in which actions are performed within or across devices and components in the system. For example, rendezvous may adapt scheduling decisions due to factors and behaviors such as load and/or degradation.

Rendezvous may be provisional. A provisional rendezvous associates a potential future action with an event, but the action is not performed unless a subsequent request is received. Generally a provisional rendezvous indicates a probable, but not committed action. A provisional rendezvous allows a rendezvous component to prepare for the request in advance of actually receiving the request. It may be advantageous for a provisional rendezvous request to include information related to the probability of a subsequent request.

Rendezvous functionality may be normative and/or informational. Normative functionality is functionality that is required for an application to behave correctly. Informational functionality is functionality that permits a rendezvous component to optimize some aspect of the system, but is not necessarily required by an application.

Access Rendezvous in a Communications Network

Figure 2:
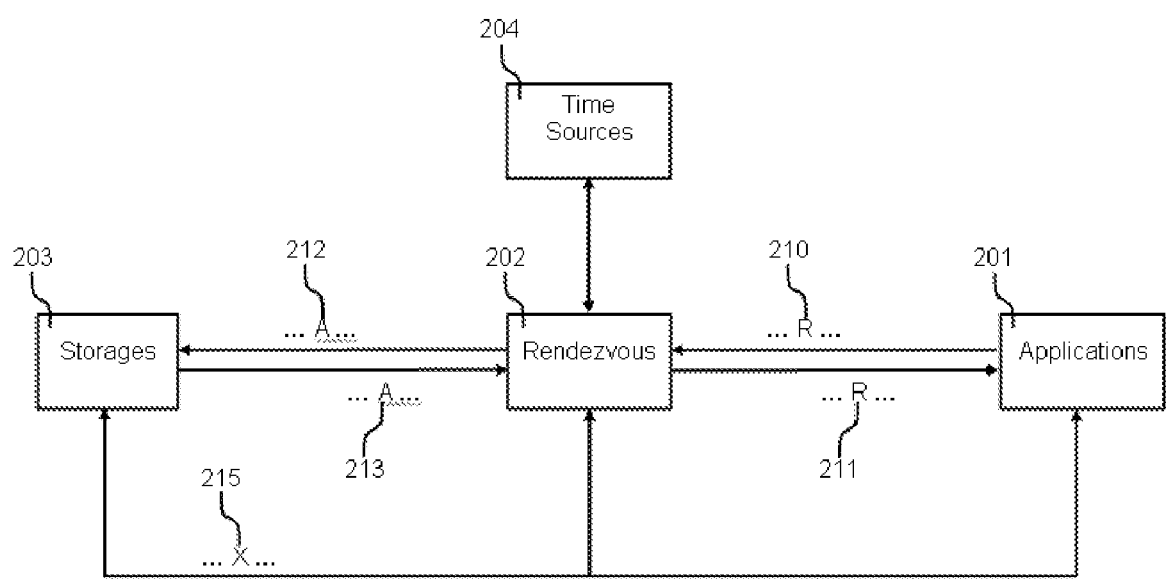
FIG. 2 shows the application of rendezvous in a communications network to access data objects in storage devices of a system.

Referring to FIG. 2, rendezvous scheduling is applied to accessing data objects in a communications network. One or more rendezvous components 202 extend one or more storage devices 203 with rendezvous functionality, and provide an interface to this functionality to one or more applications 201. Applications 201 can be, for example, direct producers or consumers of stored objects in the system, or for example, they can be components that mediate access to stored objects to one or more other components in the system. Storage devices 203 are examples of devices 103, time sources 204 are examples of event generating objects 104, and applications 201 are examples of applications 101. Applications 201 and rendezvous components 202, or objects associated with these components, are also examples of rendezvous locations 105. Throughout this section of the system description the term access is used broadly, meaning for example, to create, delete, read, write, modify, monitor, manage, etc. storage devices 203 and the objects the storage devices 203 handle. Storage devices 203 can be, without restriction, any kind and combination of storage devices. For example, storage devices 203 can be individual physical storage devices (e.g., disk drives, memory stores, etc.), aggregated physical storage devices (e.g., disk arrays, clustered storage, storage area networks, etc.), logical or virtual storage devices (e.g., partitions, volumes, or other storage abstractions and organizations), etc. More generally, it will be evident to one studying the details of this invention that the broad definition of component and the flexibility in component organizations and topologies described for FIG. 1 can be applied to implement many useful systems and sub-systems incorporating access rendezvous functionality. In this system description, integrated or composite components that present rendezvous functionality together with storage functionality are referred to as rendezvous aware storage devices.

A rendezvous-access protocol is a set of rules governing access to rendezvous aware storage functionality through the transmission of messages to and from rendezvous components 202. Similarly, an access protocol is a set of rules governing access to storage through the transmission of messages to and from storage devices 203. It is anticipated that rendezvous aware access protocols will be defined, that rendezvous awareness will be added to existing access protocols, and that access aware rendezvous protocols will be defined for use in conjunction with access protocols. Examples of existing access protocols that would benefit from being made rendezvous aware range from lower layer protocols such as the Small Computer Systems Interconnect (SCSI), protocols for alternative SCSI transport (e.g., iSCSI), FibreChannel, protocols for Direct Data Placement (DDP), and Remote Direct Memory Access (RDMA), etc. to upper layer protocols such as HyperText Transport Protocol (HTTP), File Transport Protocol (FTP), peer-to-peer protocols (e.g., BitTorrent), etc. Rendezvous enabling HTTP, for example, would offer tremendous benefits: it would enable improved performance of traditional World Wide Web (WWW/Web) services by providing a means to discriminate, organize, and optimize high volume handling of disparate and unassociated messages and message flows; further, it would enable the application of HTTP to efficiently handle data types, such as audio and video, that require something more advanced than best effort access and delivery semantics.

R 210 represents a message sent from an application 201 to a rendezvous component 202; message R 210 is an example of message R 110. R 210 may be, for example, a rendezvous request with a set of action parameters that specify an access to be performed, a set of event parameters that specify a time with respect to which the access is to be performed, and a set of location parameters that specify one or more source and/or destination objects associated with the access (these sets of parameters may overlap and one or more of the sets may be null). For example, the request could be to read a data object from storage into an application buffer by a specified time, or to write a data object to storage from an application buffer by a specified time, or to read data object from storage into a sequence of application buffers by a sequence of specified times, etc. Message R 210 is also referred to as a rendezvous-access request in this system description.

R 211 represents a message sent from a rendezvous component 202 to an application 201: message R 211 is an example of message R 111. R 111 may describe a state or change in state in the rendezvous component; zero or more such messages may be sent in response to a rendezvous-access request, for example, to acknowledge the request, to describe the disposition (e.g., scheduling) of the requested rendezvous-access, to indicate progress, success, or failure of the requested rendezvous-access, etc. It may or may not be advantageous, depending on the implementation, for message R 211 to transfer data associated with the requested rendezvous-access.

A 212 represents a message sent from a rendezvous component 202 to a storage device 203; message A 212 is an example of message D 112. Message A 212 may be, for example, an access request. A principal function of rendezvous components 202 is to transform rendezvous-access requests into access requests such that (1) accesses are performed in a manner that satisfy the parameters of their associated rendezvous, and (2) the performance of one or more components (e.g., storage, processing, network components, etc.) in the system is improved thereby increasing the scalability of the system. For example, by using rendezvous request information a rendezvous component 202 can transform a random work load generated by unassociated applications into an organized work load that minimizes head movement in disk storage devices. As discussed below, access requests generated by rendezvous components can be rendezvous-access requests as would be the case, for example, when the storage devices are themselves rendezvous aware.

A 213 represents a message sent from a storage device 203 to a rendezvous component 202; message A 213 is an example of message D 113. Zero or more such messages may be sent in response to an access request, for example, to acknowledge the request, to indicate progress, success, or failure of the requested access, etc. It may or may not be advantageous, depending on the implementation, for message A 213 to transfer data associated with the requested access.

X 215 represents a message sent from an application 201 or a rendezvous component 202 to a storage device 203, or a message sent to an application 201 or a rendezvous component 202 from a storage device 203. Depending on the implementation and the circumstances, it may or may not be advantageous for data associated with accesses to flow through one or more rendezvous components 202. FIG. 2 highlights the option of having data transfers such as X 215 flow directly between applications 201 and storage devices 203 thereby relieving rendezvous components 202 from the burden of handling some or all such data in addition to other tasks. Note that depending on the implementation one or more data transfers such as X 215 may be performed in response to a rendezvous-access request. Further, depending on the implementation and the circumstances, the order that data is transmitted may or may not be the same as the order in which the data is subsequently used. These alternatives highlight the flexibility in system design and optimization that rendezvous bring to accessing objects in a communications network (e.g., rendezvous ensures that applications get what they need when and where they need it, while the system is given greater freedom to optimize its behavior in responding to such needs).

It is anticipated that implementations of rendezvous components 202 will vary in sophistication depending on multiple factors: sophistication in rendezvous component and protocol design, knowledge about storage devices 203 and the access methods used, information exchanged with applications 201, network components, and other components of the system, etc. It is further anticipated that depending on the implementation it may be advantageous for rendezvous components to incorporate support for mirrored storage devices (e.g., to perform load balancing) as well as for other storage device abstractions and virtualizations.

The ability to probe a data object may be supported directly in the access protocol or it may be supported by using provisional rendezvous. A probe is generally used to indicate probable, but not committed future accesses as is the case, for example, when an interactive application presents a user with a set of choices. A web page, DVD menu, or virtually any user interface containing links to other stored data objects could probe some or all of the data objects associated with choices thereby giving rendezvous components 202 information about potential future requests. Rendezvous components 202 may use such information to prepare for prompt response once a choice is made, for example, by bringing probed data objects into a cache. A programmatic (versus an interactive) application could also use probes. For example, if the outcome of one access determines which of a set of accesses is performed next, the one access could be accompanied with one or more probes depending on the likely next accesses.

The following scenarios describe how access rendezvous in a communications network is important to optimizing aspects of a system. These are a few representative examples; further scenarios will be evident to one studying the details of this invention.

In one scenario, one or more applications 201 generate rendezvous-access requests according to its performance requirements, and one or more rendezvous components 202 interface to one or more disk devices (examples of storage devices 203). Rendezvous components 202 use rendezvous-access request information as input to a heuristic that optimizes disk performance—the literature describes a number of heuristic approaches (e.g., EDF, SCAN, LOOK, CSCAN, PSCAN, FDSCAN, SSTF, SSEDO/V, etc.) and other variations are possible depending on the requirements and objectives of a particular implementation. In this scenario, rendezvous components 202 model one or more disk devices with which they communicate and maintain a queue of outstanding accesses for each. As rendezvous-access requests arrive at a rendezvous component, the rendezvous and access parameters are examined, and using one or more device models each request is placed in one or more access queues so as to minimize disk head movement and rotational delays while also giving priority to completing accesses by their rendezvous time. In some implementations, rendezvous components 202 might divide a large request into multiple smaller requests (e.g., to balance access with other requests) or might consolidate or combine separate small requests into a larger request (e.g., to reduce message overhead) in order to better manage device operation and access objectives.

In a second scenario, the first scenario is extended such that rendezvous components 202 either detect or are informed explicitly that a data object is being accessed in a particular temporal/spatial pattern or distribution (e.g., periodic sequential, interactive statistical, best effort quasi-random, etc.) such that probability and other information parameters can be associated with potential future rendezvous-access requests (i.e., predictions can be made). Marshalling a streaming media object to a record or playback application is one example: rendezvous components 202 may transform a request to access one block of the object into a request to access many blocks of the object, thereby moving or staging blocks that are likely soon to be accessed into more readily accessible memory (e.g., into a device cache).

In a third scenario, streaming applications, interactive applications, and search applications are commingled. Each exhibit a different access pattern: sequential periodic, statistical interactive, and best-effort quasi-random respectively. Here, rendezvous-access requests provide crucial information that lets rendezvous components 202 optimize the performance of storage devices 203 across heretofore disparate types of access. In particular, the rendezvous parameters enable the accesses generated by query applications to proceed when the accesses generated by streaming and interactive applications with distant rendezvous times can be deferred. Further, the rendezvous information may call for the accesses generated by interactive applications to proceed even if the rendezvous time is exceeded, thus should contention arise, the interactive application avoids an outright denial of service by allowing the accesses generated by streaming applications to take precedence. Optimizations, especially opportunistic optimizations, can be applied across all accesses. For example, a sequential access with a distant rendezvous time (or a portion thereof) may be grouped or sequenced with a best effort random access that is in close spatial proximity (e.g., on disk). Or the converse, a best effort random access may be grouped or sequenced with a sequential access with a near rendezvous time.

These scenarios describe a few ways that rendezvous in a communications network (rendezvous components 202 and the exchange of rendezvous information) can be used to optimize aspects of a system. Though disk drives are the common examples given in these scenarios, it is important to recognize (a) that optimizations may involve other resources in the system (e.g., network bandwidth, network congestion, link utilization, power consumption), and (b) that all systems, subsystems, and components, not only disk drives, have resource constraints that can be managed with rendezvous. Whereas in these scenarios the rendezvous information is used to increase disk performance by reducing head seek and rotational delays (significant factors in disk performance), rendezvous information is equally applicable to increasing performance in situations where a different set of constraints dominate (e.g., switching, processing, or power resources in a RAM based storage).

Further, the above scenarios focus on the use and benefits of rendezvous access to storage with a specified rendezvous time. In so doing, multiple access requests can be managed to optimize overall performance, while honoring rendezvous times of the requests. Rendezvous concepts can be applied in many other innovative ways. Rendezvous can be applied to optimize one or more access parameters instead of or in addition to time and performance, such as power saving, device wear and failure conditions, latency, graceful degradation, buffer capacity, channel bandwidth, network traffic shaping, etc. One or more of these parameters would be incorporated into alternate device models similar to those described above.

A solid-state memory storage device, for example, might contain several banks of memory. When not being accessed, a bank of memory can be placed into a standby powered state to reduce power consumption and heat generation. When being accessed, a bank of memory would be placed into an active powered state. The device model describes how the memory is divided into banks and the operational behavior of power switching and accessing banks of memory. Rendezvous scheduling can be used to order multiple accesses so as to group accesses to a bank of memory, such that the bank of memory transitions from standby to active powered state for the group of accesses then back to standby. Thereby, power switching and consumption costs (e.g., power, latency, etc.) can be optimized across the group of accesses. Also, accesses can be grouped to overlap active access to one bank of memory, while the next bank to access is being prepared to switch from standby to active power, and so forth.

In addition to storage, rendezvous can be used to manage the full breadth of resources in the network and the resources of the network—servers, services, connections, routers, routes, etc. For example, rendezvous can be used to manage a shared compute service on a network, so that multiple requests for service can be reordered to optimize overall service performance. Moreover, as (micro)computer architectures, increasingly use more networking concepts, a rendezvous protocol can be used for intra computer accesses. For example, memory access by one or more CPUs can be augmented similarly to the scenarios described above. Rendezvous provides more flexibility and control of access than existing cache management and memory probe mechanisms. Rendezvous can be applied to access other computer components beside memory.

Rendezvous Transformations in a Communications Network

Figure 3:
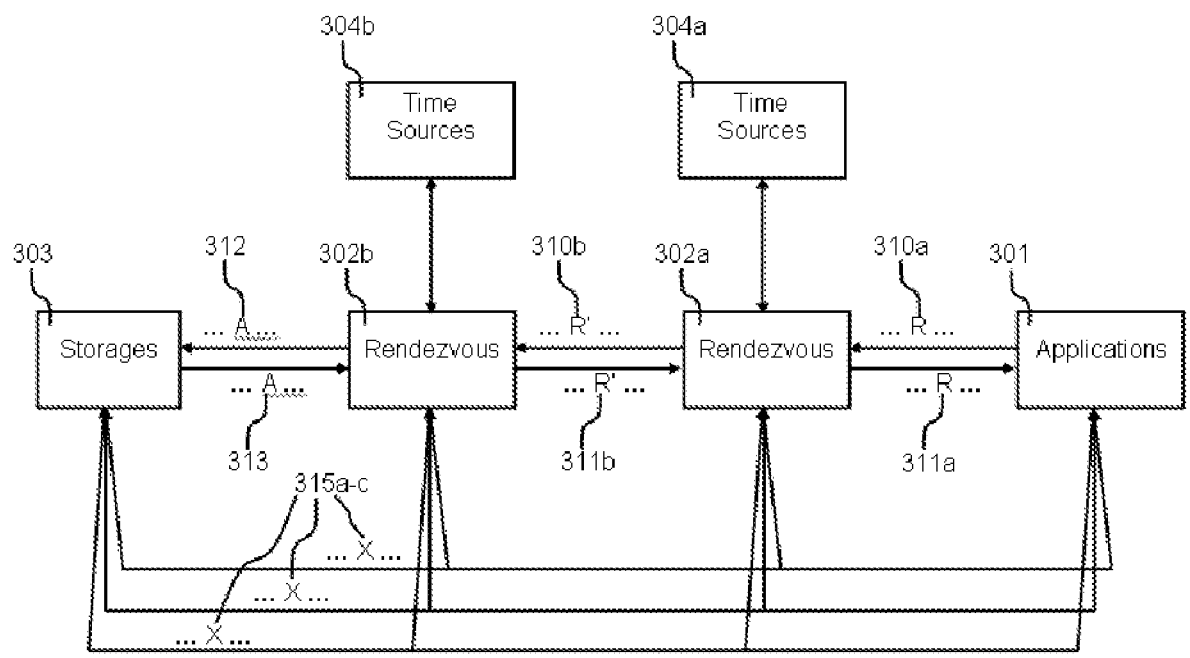
FIG. 3 shows the use of rendezvous transformations in enabling multiple rendezvous components to cooperate.

Referring to FIG. 3, one or more additional rendezvous components are added to the arrangement illustrated in FIG. 2 such that (1) components 302a, examples of rendezvous components 202, relate to applications 301 as a set of rendezvous aware storage devices and relate to rendezvous components 302b as a set of rendezvous applications, and (2) components 302b, also examples of rendezvous components 202, relate to rendezvous components 302a as a set of rendezvous aware storage devices and relate to storage devices 303 as a set of rendezvous components. Rendezvous components 302a could, for example, present a rendezvous aware storage abstraction (e.g., rendezvous aware storage aggregation or virtualization) to applications 301, or could, for example, be an assembly component that assembles and/or disassembles (or controls the assembly and/or disassembly) of objects in a communications network. FIG. 3 highlights for instructional/illustrative purposes just one of many useful arrangements envisioned with respect to the present invention. Though FIG. 3 shows two sets of rendezvous components (302a and 302b), any number or topology of rendezvous components could be employed depending on the requirements of an implementation. Applications 301 are examples of applications 201. Storage devices 303 are examples of storage devices 203.

R 310a represents a message sent by an application 301 to a rendezvous component 302a; message R 310a is an example of message R 210. R 311a represents a message sent by a rendezvous component 302a to an application 301; message R 311a is an example of message R 211. R' 310b represents a message sent by a rendezvous component 302a to a rendezvous component 302b; message R' 310b is an example of message R 210. R' 311b represents a message sent by a rendezvous component 302b to a rendezvous component 302a; message R' 311b is an example of message R 211. A principal function of rendezvous component 302a is to transform zero or more rendezvous-access requests such as R 310a into zero or more rendezvous-access requests such as R' 310b and to transform zero or more messages such as R' 311b into zero or more messages such as R 311a. A 312 represents a message sent by a rendezvous component 302*b* to a storage device 303; message A 312 is an example of message A 212. A 313 represents a message sent to a rendezvous component 302*b* from a storage device 303; message A 313 is an example of message A 213. X 315*a-c* represent messages sent from one or more applications 301, one or more rendezvous components 302*a*, or one or more rendezvous components 302*b* to one or more storage devices 303, or messages sent to one or more applications 301, one or more rendezvous components 302*a*, or one or more rendezvous components 302*b* from one or more storage devices 303; messages X 315*a-c* are examples of message X 215. As in FIG. 2, FIG. 3 highlights the option for data transfers to be handled separately or even out-of-band using separate communications network resources. FIG. 3 further highlights that in some implementations rendezvous components may not be involved in the data transfers (e.g., X 315*a-c*) or may only be involved under certain circumstances.

Consider an example application for this kind of arrangement: One or more data objects are striped or otherwise distributed across one or more rendezvous aware storage devices in a communications network. A rendezvous aware assembly component uses information about the placement of the data objects to transform an incoming rendezvous-access request such as R 310*a* into one or more constituent rendezvous-access requests such as R 310*b* sent to the appropriate rendezvous aware storage device(s). The assembly component could, for example, take a request to read a single object into an application buffer by a specified time and transform the request into two or more constituent requests each to read a piece of the object from an appropriate rendezvous aware storage device into an appropriate portion of the application buffer. The access and rendezvous parameters for the constituent requests would be transformed from those in the original request such that all the pieces of the object rendezvous at the right places in the application buffer by the appointed time. The assembly component may or may not be involved in the actual data transfers (e.g., X 315*a-c*) depending on the data placement and reconstruction strategies used. The assembly component could also issue probes or provisional rendezvous-access requests to storage devices not affected directly by the current request in preparation for subsequent accesses.

Consider a second example: A disk drive with an integrated rendezvous component (a rendezvous-aware disk device) is built to support tens or hundreds of outstanding requests. One or more such devices could be linked to one or more other rendezvous components that handle thousands or tens of thousands or more of outstanding rendezvous requests by transforming them into a sequence of requests appropriate to the rendezvous capabilities of each rendezvous aware device.

One should expect an interactive application to be given higher priority than a data mining application, as responsiveness is important to interactive applications. Yet, perception of responsiveness in many situations can be achieved with actual response times in the range of ¼ to ¾ second. High priorities would dictate that requests from interactive applications be pushed in front of lower priority requests without regard to effects on device performance and system efficiency. With the addition of a rendezvous component as described here, the request can be processed at a time that yields better overall or aggregate performance and efficiency while still achieving desired responsiveness.

One should further consider that in a large scale system where many applications or services are issuing requests to a shared device, the resulting work load will likely appear random. To many devices, random work loads result in worst case operation. The rendezvous component introduces functionality that enables the order of fulfilling requests to be modified to remove at least some of the randomness, thereby enabling improved performance (such as increased aggregate service bandwidth) and/or device behavior (such as improved MTBF, e.g., as a result of more ordered mechanical movement of the disk head arm or less power cycling of semiconductor memory (RAM, flash, etc.). More generally, the rendezvous component introduces functionality that modifies how the request is fulfilled in order to meet operating objectives; in addition to changing the order of requests, a request could be delayed, or redirected to an alternate device, or rejected, and the like.

Though several examples here present the rendezvous component as a separate entity, some implementations will benefit from having affinity between a rendezvous component and a device or set of devices. More generally, the rendezvous component may have affinity with other components in a system (storages, network switches and routers, applications, and the like), and the current invention envisions and enables such affinities. Further, some implementations will benefit from devices with integrated rendezvous components. Again, more generally, the rendezvous component may be integrated with other components in a system (storages, network switches and routers, applications, components, etc.), and the current invention envisions and enables such integrations. Thus, the concept of a rendezvous-aware component is introduced wherein a component has integrated rendezvous capabilities. A rendezvous component as described herein is inherently rendezvous-aware.

As noted above, matters concerning performance in a communications network are generally addressed from a Quality of Service (QoS) perspective. QoS mechanisms operate on the service (e.g., Differentiated Services) or session (e.g., Resource Reservation Protocol) level, and are not typically applied to or invoked with individual messages. The current invention may coexist with QoS mechanisms, for example, where the communications network is engineered, provisioned, and/or equipped with appropriate QoS attributes. Further, the current invention envisions and enables network components (switches, routers, and such) to handle data differentially based on information contained in rendezvous protocols (i.e., network components can be rendezvous-aware).

The present invention extends and augments rendezvous scheduling to operate in a communications network, thereby overcoming many present limitations (e.g., scale, scalability, cost, applicability, interoperation, manageability, and the like) of networked systems.

Moreover, the basic rendezvous concepts described above are useful in many application environments. As described above, particular attention has been given to scenarios where devices are storage devices containing data objects and support some kind of access (read, write, probe, and the like), although this is not a limitation of the invention. Consequently, this invention is envisioned as useful to (a) building systems that scale from local to enterprise, metropolitan, regional, to national uses, and beyond, and (b) building systems that unify the handling of radically different data objects without compromising on the benefits that separate and specialized systems traditionally offered.

While given components of the system have been described separately, one of ordinary skill will appreciate that some of the functions may be combined or shared in given instructions, program sequences, code portions, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The invention can take the form of an entirely hardware embodiment, an entirely software embodiment, or an embodiment containing both hardware and software elements. In one preferred embodiment, the initial layout and reflow algorithms are implemented in software executing in one or more server machines. The invention (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The principals of this invention described here are meant to be illustrative examples, and are not meant to limit the scope of the invention. One skilled in the art will recognize that further combinations, permutations, and equivalents of the invention are possible. Thus, the present invention is intended to embrace all such embodiments.

Having described our invention, what is claimed is as follows:

1. A method operative in a distributed system comprising a set of storage devices in a communications network, comprising:
   receiving a rendezvous access request from the communications network that comprises a set of one or more action parameters, a set one or more event parameters, and a set of one or more location parameters, wherein, for a given access operation, an action parameter describes an access to be performed, an associated event parameter specifies a time with respect to which the access is to be performed, and the location parameter describes a source or destination object associated with the access;
   in response to receipt of a rendezvous access request, transforming the rendezvous access request into a set of one or more device-specific requests;
   providing the one or more device-specific requests to a subset of the storage devices of the set of storage devices in the communications network such that the given access operation is performed in a manner that satisfies the action parameters, event parameters and the location parameters,
   wherein the given access operation has an associated access pattern characteristic, wherein the characteristic is one of: sequential periodic, statistical interactive, and best-effort quasi-random.

2. The method as described in claim 1 wherein the set of storage devices comprise disk devices and the rendezvous access request is generated by a given application.

3. The method as described in claim 2 wherein the given application is one of: a media server, and a Hypertext Transfer Protocol (HTTP) server.

4. The method as described in claim 3 wherein the media server application is a streaming application.

5. The method as described in claim 1 wherein a given storage device has an associated device model that describes a given access characteristic of the device, and wherein the device-specific request provided to the given storage device is a function of the given access characteristic in the device model.

6. The method as described in claim 1 wherein a given device-specific request provided to a given storage device includes information associated with one of: a current access, and a current access and an expected future access.

7. A method operative in a distributed system comprising a set of storage devices in a communications network, comprising:
   receiving a rendezvous access request from the communications network that comprises a set of one or more action parameters, a set of one or more event parameters, and a set of one or more location parameters, wherein, for a given access operation, an action parameter describes an access to be performed, an associated event parameter specifies a time with respect to which the access is to be performed, and the location parameter describes a source or destination object associated with the access;
   in response to receipt of a rendezvous access request, transforming the rendezvous access request into a set of one or more device-specific requests;
   providing the one or more device-specific requests to a subset of the storage devices in of the set of storage devices in the communications network such that the given access operation is performed in a manner that satisfies the action parameters, event parameters and the location parameters,
   wherein a given device-specific request provided to a given storage device includes information associated with one of: a current access, and a current access and an expected future access,
   wherein the given access operation has an associated access pattern characteristic, wherein the characteristic is one of: sequential periodic, statistical interactive, and best-effort quasi-random.

8. The method as described in claim 7 wherein the given access operation is prioritized with respect to one or more other access operations as a function of the associated access pattern characteristic.

9. A method operative in a distributed system comprising a set of devices in a communications network, wherein a given device has an associated device model that describes a given device characteristic, comprising:
   receiving, from the communications network, a rendezvous request that comprises a set of parameters;
   in response to receipt of a rendezvous access request, transforming the rendezvous access request into a set of one or more device-specific requests, wherein a given device-specific request is a function of a given device characteristic;
   providing the one or more device-specific requests to a subset of the devices of the set of devices in the communications network such that a given operation is performed in a manner that satisfies the set of parameters in the rendezvous request,
   wherein a given device-specific request provided to a given storage device includes information associated with one of: a current access, and a current access and an expected future access, wherein a given access operation has an associated access pattern characteristic, wherein the characteristic is one of: sequential periodic, statistical interactive, and best-effort quasi-random.

10. The method as described in claim 9 wherein the devices are storage devices.

11. The method as described in claim 9 wherein the set of parameters include one of: time, performance, power saving, device wear and failure conditions, latency, graceful degradation, buffer capacity, channel bandwidth, network traffic shaping, and combinations thereof.

12. The method in claim 1 wherein one or more data objects are distributed across one or more collections of storage devices using a dispersal technique, and wherein access to the data objects includes a set of constituent requests to the collections of storage devices, the requests including location and timing rendezvous parameters specifying a destination location where and a time when a given data object is to be reconstituted.

13. The method as described in claim 7 wherein the set of storage devices comprise disk devices and the rendezvous access request is generated by a given application.

14. The method as described in claim 13 wherein the given application is one of: a media server, and a Hypertext Transfer Protocol (HTTP) server.

15. The method as described in claim 14 wherein the media server application is a streaming application.

16. The method as described in claim 7 wherein a given storage device has an associated device model that describes a given access characteristic of the device, and wherein the device-specific request provided to the given storage device is a function of the given access characteristic in the device model.

* * * * *